(12) United States Patent
Tsiguloff

(10) Patent No.: US 6,775,891 B1
(45) Date of Patent: Aug. 17, 2004

(54) TABLE TOP APPARATUS FOR FITTING GRIPS TO SHAFTS

(76) Inventor: Todd Tsiguloff, 8725 Waterwood Ct., Fort Wayne, IN (US) 46804

( * ) Notice: Subject to any disclaimer, the term of this patent is extended or adjusted under 35 U.S.C. 154(b) by 0 days.

(21) Appl. No.: 10/351,044

(22) Filed: Jan. 24, 2003

(51) Int. Cl.[7] .................................................. B23P 19/04
(52) U.S. Cl. ......................................................... 29/235
(58) Field of Search ........................... 29/235, 234, 237, 29/238, 450, 423, 280

(56) References Cited

U.S. PATENT DOCUMENTS

| 4,016,640 A | 4/1977 | Briggs |
| 4,134,198 A | 1/1979 | Briggs |
| 4,783,893 A | 11/1988 | Farino |
| 4,899,428 A | 2/1990 | Hsu |
| 5,407,026 A | 4/1995 | Vald'via |
| 5,429,706 A * | 7/1995 | Cresse et al. ................ 156/356 |
| 5,765,758 A | 6/1998 | Chu |
| 5,909,912 A | 6/1999 | Mueller |
| 6,245,178 B1 | 6/2001 | Lenhof et al. |
| 6,298,546 B1 | 10/2001 | Slota |

* cited by examiner

Primary Examiner—Robert C. Watson
(74) Attorney, Agent, or Firm—O'Malley and Firestone

(57) ABSTRACT

The patent illustrates an apparatus for radially expanding an elastic handgrip on its axis of elongation to allow easier introduction of a shaft to the elastic handgrip by an open end of the grip. The main body of the apparatus provides support for the shaft and fixes the position of grip end expansion wedge. A tail stock section provides a cup for receiving an end of the grip and positioning the grip to introduce a ventilation probe to the grip. An alignment laser is built into the tail stock for aligning a golf club shaft. The tail stock and main body are separable to allow different sizes of grips to be readily handled.

10 Claims, 8 Drawing Sheets

TABLE TOP APPARATUS FOR FITTING GRIPS TO SHAFTS

BACKGROUND OF THE INVENTION

The present invention relates generally to golf club assembly and maintenance and, more particularly, to an apparatus for fitting a handgrip over and onto the free end of a golf club shaft.

A golf club has a shaft with a club head at one end and a handgrip at the opposite free end of the shaft. The shaft is a straight, elongated rod or tube fabricated from a suitable material. Contemporary shafts are typically made from an aluminum alloy or a graphite composite. The typical handgrip is a hollow tube open at one end and usually substantially closed at the other end except for a small vent. The handgrip is usually made from an elastomeric material which can be stretched, with some difficulty, over the free end of the shaft for installation onto the shaft. The vent allows air to escape from the handgrip during fitting and aligning of the grip on the shaft.

With use, a golf club's handgrip deteriorates and must be replaced, from time to time, during the useful life of the club. Fitting a new handgrip as a replacement grip on an old club involves stripping the old grip from the free end of the club shaft, cleaning the shaft of an adhesive used to bind grips to the shaft, preparing the shaft to receive a new grip and then fitting the new grip over the free end of the shaft. Preparing the shaft for a new grip may involve application of fresh adhesive to the shaft, which sometimes includes wrapping the shaft with double sided tape. The new handgrip then must be pulled down onto the shaft, or the shaft end inserted into the grip.

The handgrip itself is usually made so that in a unstretched condition it has a slightly smaller interior diameter than the outside diameter of the shaft end it is to be fitted to. This necessitates stretching the grip to fit the grip onto a shaft. If tape has been wound on the shaft, pulling the grip down over the shaft can result in localized contact between the interior of the grip and the tape and in pulling the tape apart in areas where the winds of the tape overlap. This can result in the wind of the tape becoming locally stretched or bunched up, producing a feeling in users of the club of an uneven grip. The presence of wound tape on a shaft exaggerates the problem of evenly fitting new handgrip to a shaft so that the grip exhibits a good feel to the user and is highly stable in its position.

Numerous patents have been issued directed to the problem of fitting grips to golf club shafts. Several references have dealt with methods of using air pressure, either as a vacuum applied around the exterior of the grip or as over pressure inside the grip, to expand the grip sufficiently to allow it to be easily slipped over the free end of a shaft. The air pressure can then be released to allow the grip to contract around the shaft. In general, the objectives are to provide quick, secure and accurate positioning of grips to clubs.

U.S. Pat. No. 5,429,706 to Cresse et al., illustrates one use of compressed air to inflate and thereby swell a handgrip allowing shaft and grip to be easily mated. Cresse et al., observes that the closed end of a handgrip typically has a small orifice. Where no orifice exists, the grip can be easily pierced to provide one. Cresse et al. supply a support body which has a nipple insertable through the orifice from outside of the grip. Air under pressure is introduced to the inside of the grip through the nipple after first introducing the shaft sufficiently to seal the interior of the grip.

SUMMARY

An object of the invention is to provide a mechanically simple handgrip fitting and aligning apparatus usable on a work bench.

Still another object of the invention is to provide a mechanism which eases insertion of golf club shafts into handgrips.

The invention provides an apparatus for radially expanding an elastic handgrip on its axis of elongation to allow easier introduction of a shaft to the elastic handgrip by an open end of the shaft. The apparatus has two principal sections including a main body which provides a central plenum which cradles a grip being installed on a shaft. A second section is a tail stock section having a cup disposed to receive one end of the elastic handgrip. The main body and the tail stock section align on one another end to end, but are not directly connected to one another, allowing the spacing between the sections to be adjusted for different sized grips. A ventilation probe extends from the center of the cup in the tail stock section forward for introduction to the grip. A laser sighting aid is installed in the tail stock section. A grip end wedge tool fits around a shaft and is positionable in the main body near the end opposite to the end proximate to the tail stock section.

Further provided are a source of compressed air and an attachment between the source of compressed air and the ventilation probe for delivering air under pressure to an interior of an elastic handgrip under the control of the user.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
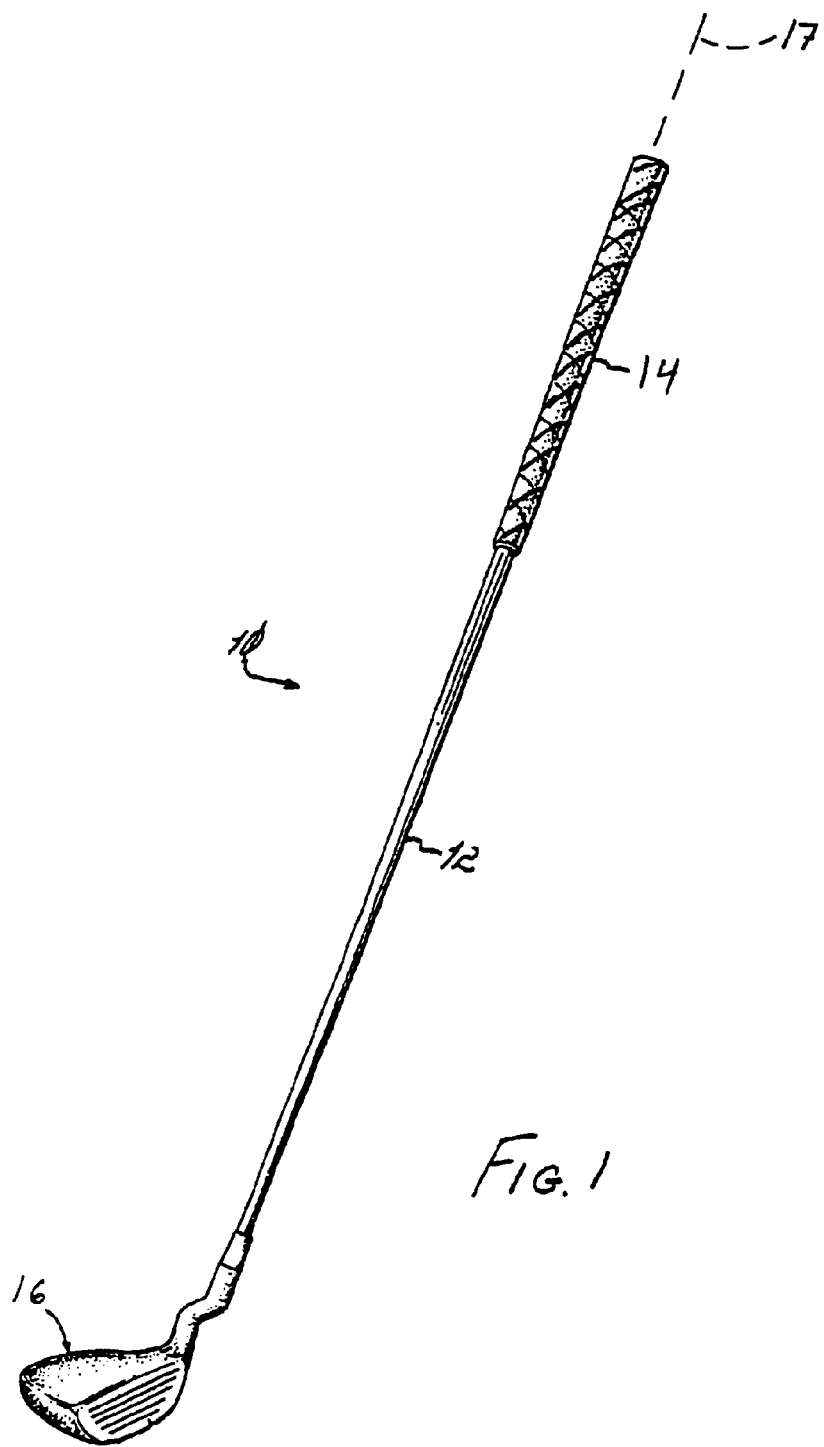
FIG. 1 is a perspective view a golf club having an elastic hand grip.

Referring now to the drawings in which a preferred embodiment of the invention is illustrated, and with reference to the manner of using the invention to apply a hand grip to a shaft, particularly the shaft of a golf club, is explained. FIG. 1 is a perspective view of a golf club 10 having a straight shaft 12. An elastic hand grip 14 is fitted over one end of shaft 14. A club head 16 is attached to the opposite end of the shaft 12 from the elastic hand grip 14. Hand grip 14 is subject to wear with use, and the consequent need for replacement. Additionally, owners of clubs may wish to shorten the shafts of clubs from older sets for children, with the need to remove and replace a handgrip 14.

Typically, handgrips have been removed and replaced professionally. An adhesive, used to bond the handgrip 14 to the end of shaft 12, is applied to a clean shaft and the handgrip 14 is fitted over the shaft end. Various vacuum or pressurization systems have been proposed to expand temporarily the handgrip 14 to ease its fit over the end of the shaft 12. In any system, after an old grip has been removed, the shaft must be cleaned of any old material. If a shaft 12 is to be shortened, the freshly cut end of the shaft should be carefully deburred and squared with the shaft 12 center line 17. If the handgrip has a preferred rotational alignment, the shaft 12 should be marked to indicate this before use of the invention to fit a new hand grip 14.

Figure 2:
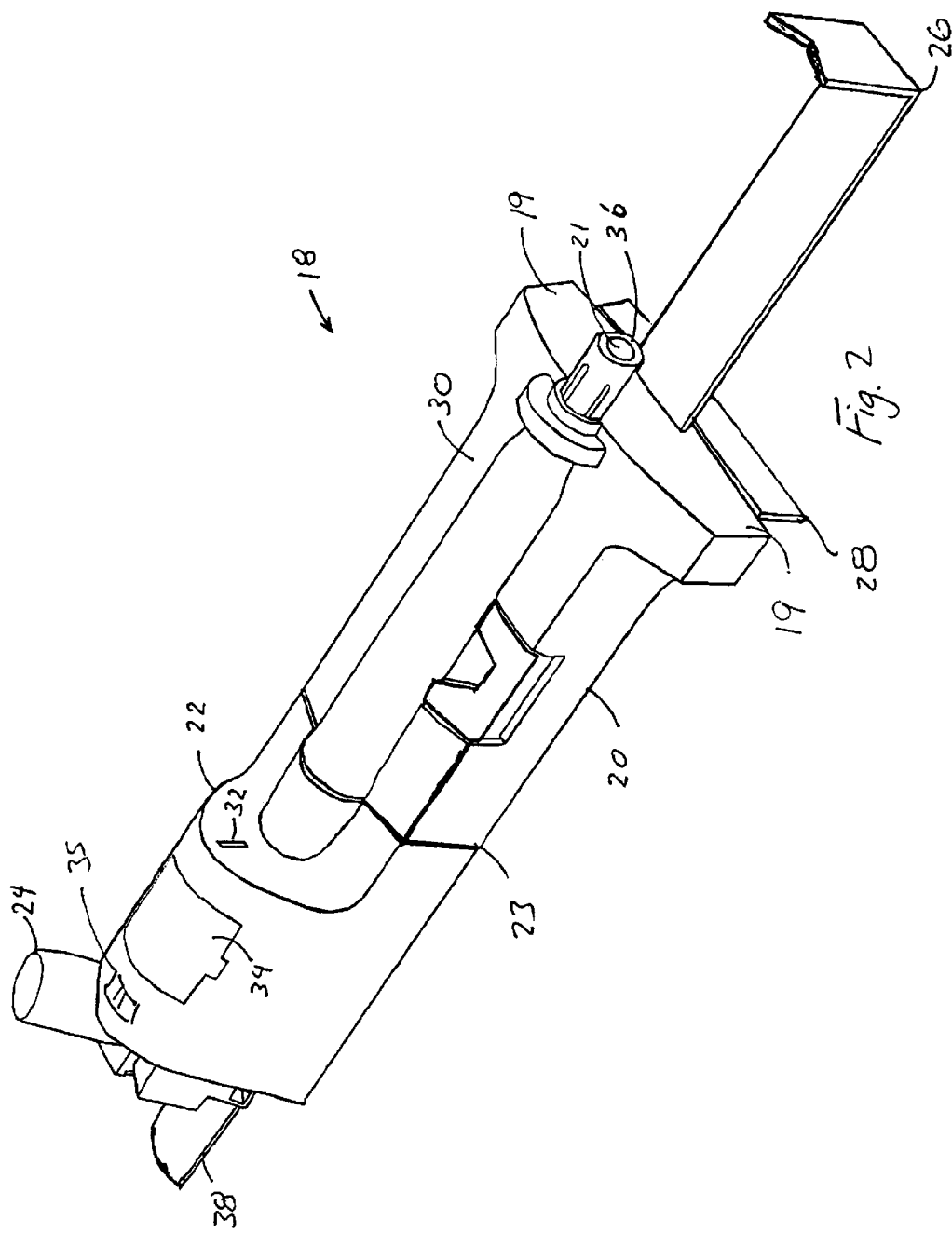
FIG. 2 is a perspective view of a table top grip installation station.

Referring now to FIG. 2, a table top golf club grip installation station 18 in accord with a preferred embodiment of the invention is illustrated. Installation station 18 comprises a main body or cradle section and a tail stock section 22. Main body section and tail stock section 22 are illustrated aligned end to end along a seam 23. Main body section further comprises an extensible support 26 for support a golf club shaft the grip end of which has been positioned in the main body section. Extensible support 26 extends from the end of main body opposite to the end proximate to seam 23. Extending downwardly from the same end of the main body 20 opposite to seam 23 is a bracket 28 shaped to fit against a table edge for bracing the main body section. Most of the top of main body section is formed by a cover lid 30. Extending forward from main body aligned with extensible support 26 is a cylindrical grip end expansion tool 36, which is captured by the lid in and against the main body 20. Flare ends 19 extend latitudinally to either side of the main body at the muzzle end thereof. Flare ends 19 provide a brace point to position a hand or thumb to brace the main body as a shaft is forced into the muzzle opening 21 of expansion to n air pressure regulator 24 is attached to the back of tail stock section 22. Tail stock section 22 provides for expansive ventilation of a grip as explained below.

A slit 32 in one face of the tail stock section 22 is directed toward the main body and provides for passage of an alignment line from a laser beam projector (not shown) behind slit 32. A battery for powering the laser beam projector is installed under lid 34. Tail stock section 22 slides on extensible support 38 which extends from a back face of the tail stock section. A switch is provided for turning on the laser. The laser beam projector (not shown) includes lens to spread the beam to a line with which clubs are aligned.

Figure 3:
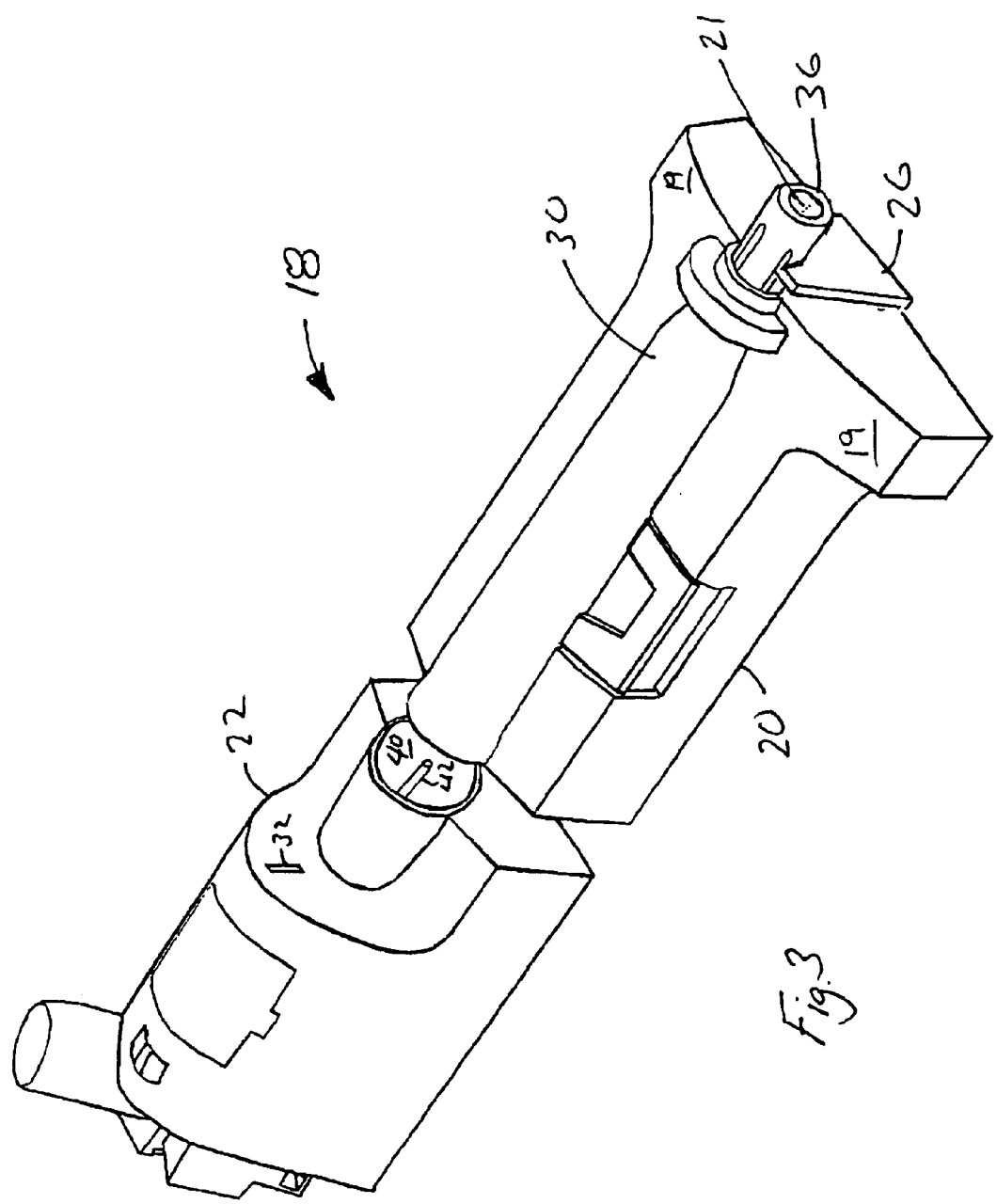
FIG. 3 is another perspective view of the table top grip installation station with an extensible support retracted.

FIG. 3 illustrates varying the relative positioning of tail stock section 22 and main body section with respect to one another to handle grips of varying size. Visible in the now exposed end of tail stock section facing the complementary end of main body is a grip receiving cup 40 opened toward the main body. A ventilation probe 42 is centrally disposed in cup 40, positioned and oriented so that when tail stock section 22 and main body section are aligned and appropriately spaced, a grip positioned in the main body is introduced by its closed end to probe 42, which should be coaxial with the centerline of the shaft of a club. Probe 42 is provided to penetrate grip ends to provide an air channel into a grip which has been fitted around, but not finally positioned on, a shaft's end. The other end of the shaft, including the portion outside of a grip, will extend from wedge tool 36. Main body section has a length selected to substantially contain a grip. Support 26 is illustrated retracted into main body section 20.

Figure 4:
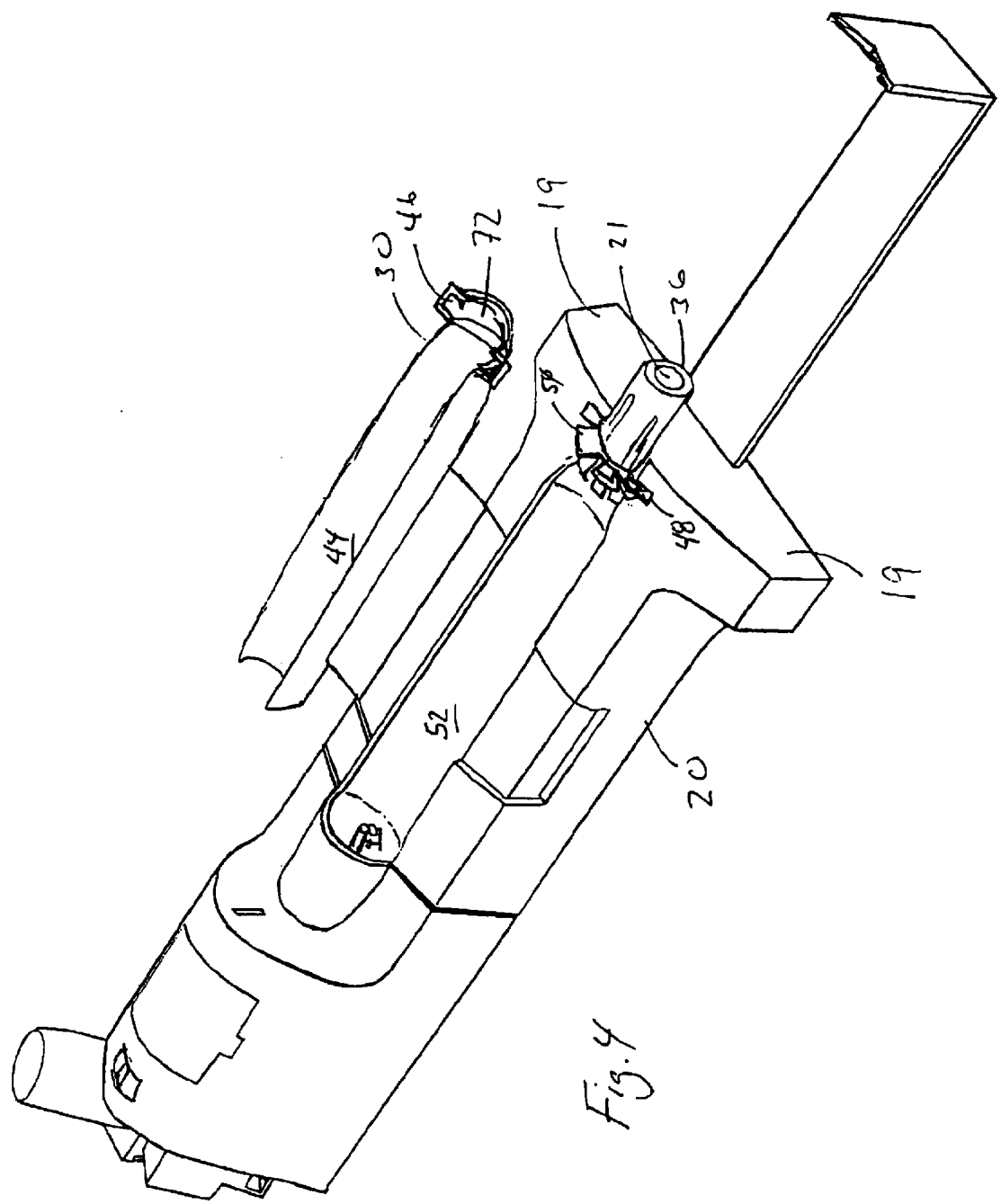
FIG. 4 is still another perspective view of the table top grip installation station with a cover lid lifted to expose a central grip retaining plenum.

FIG. 4 illustrates the location of a central cradle or plenum for a grip inside main body section 20. A recess formed by an indented hemi-cylindrical surface 52 in the upper surface of the main body section provides a supporting base for a grip laid into the recess. Hinged lid may be closed on surface 52 to form a cylindrical enclosure between surface 52 and a second hemicylindrical surface 44 which is open at its end proximate to cup 40 and is partially closed at its opposite end by wedge tool 36, which has a muzzle end 21 through which a club shaft may pass. Lid further includes an end section 46 which includes a slot 72 sized and positioned to engage a plurality of flanges 50 extending radially outwardly from tool 36. Flanges 50 also fit into a slot 48 cutting into the upper surface of main body section 20.

Figure 5:
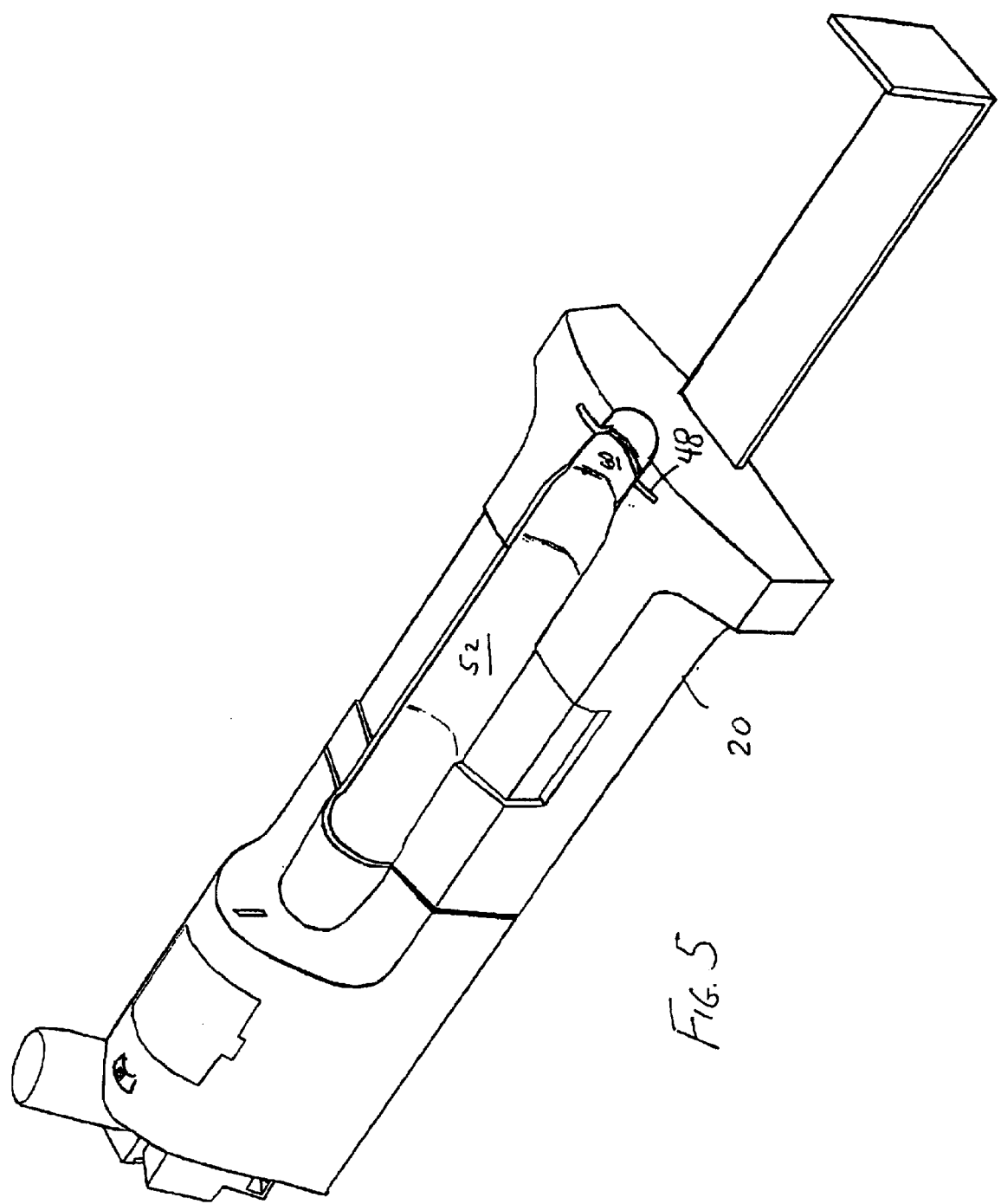
FIG. 5 is a perspective view illustrating the main body with lid and wedge tool removed.

Referring to FIG. 5, where tool 36 has been removed, slot 48 may be seen to extend from side to side of a recess 60. The combination of slots 48 and 72 form a hollow disc for capturing flanges 50.

Figure 6:
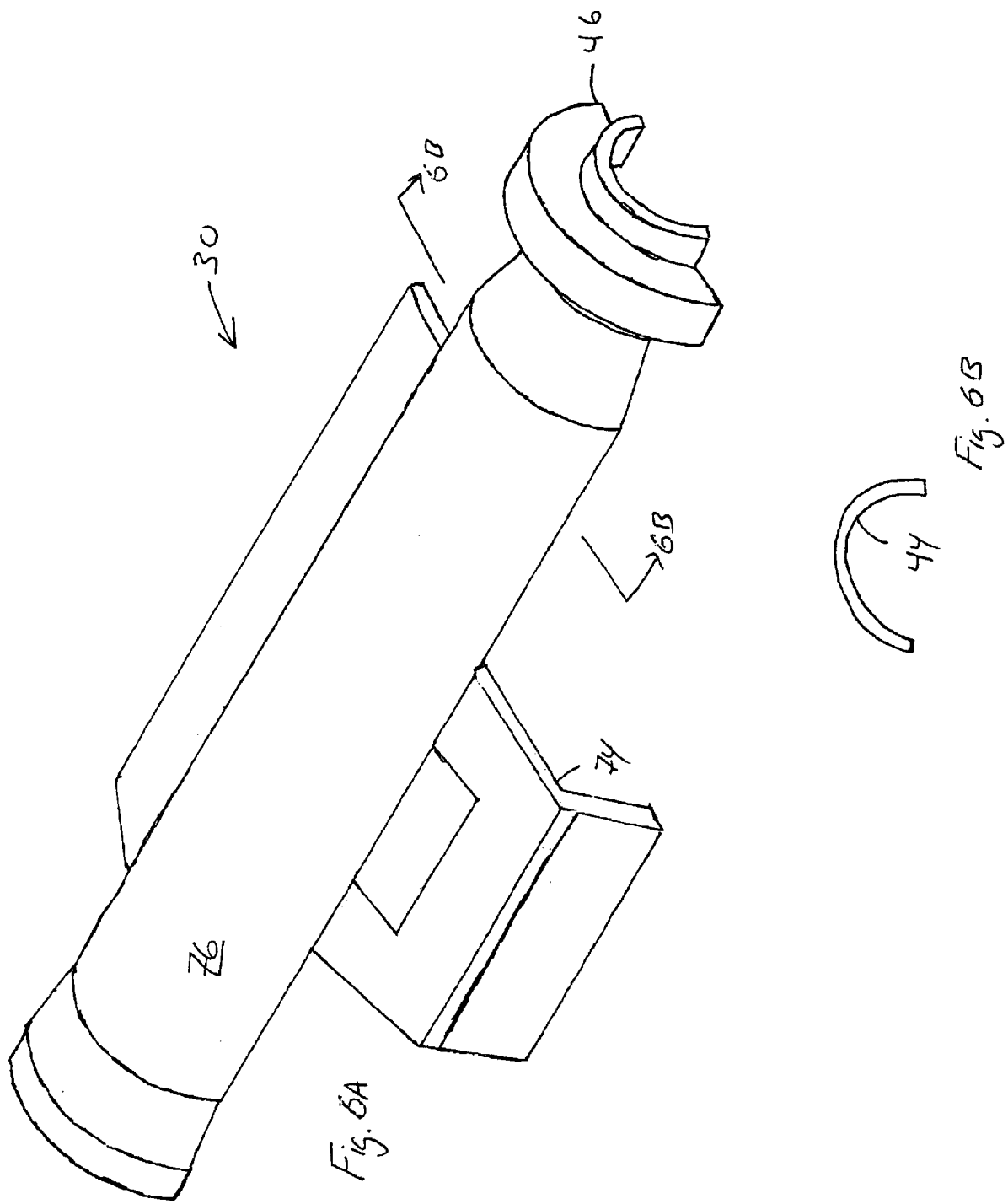
FIGS. 6A–B illustrate the lid in perspective and cross section.

FIGS. 6A and 6B illustrate lid in greater detail. A handle 74 extends to one side from a central, half cylinder section 76. The profile of arcuate interior surface 44 of half cylinder section 76 may be seen in section in FIG. 6B. A half ring section 46 terminates one end of half cylinder section 76 to provide for retaining slot 72 for the flanges 50 depending from wedge tool 36.

Figure 7:
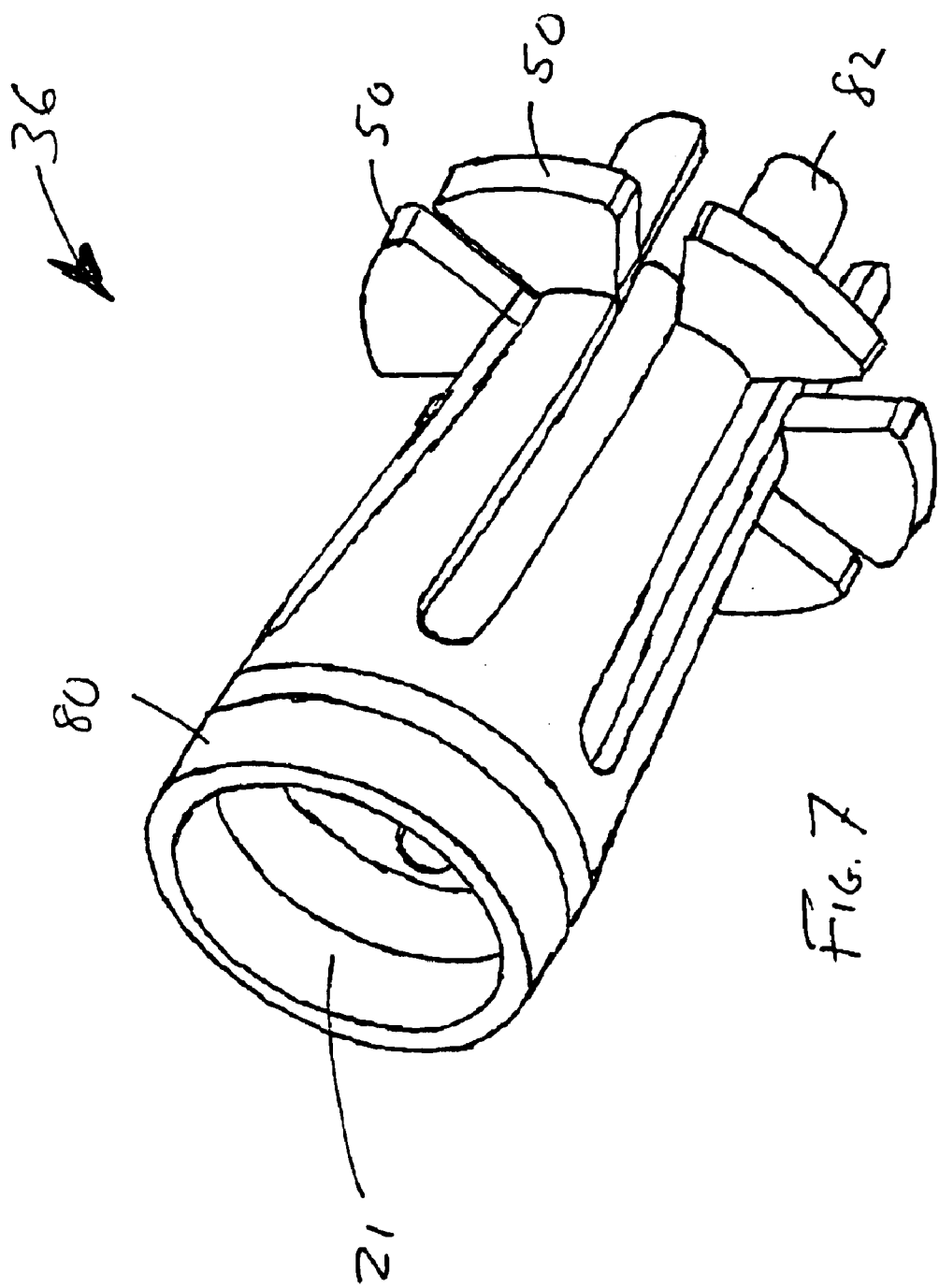
FIG. 7 is a perspective view of a grip end wedge expander tool.

FIG. 7 illustrates grip end expansion tool 36 in greater detail. Tool 36 is based in a ring 80 which defines a central opening and muzzle end 21. Extending from ring 80, substantially parallel to the central axis of muzzle 21 are a plurality of spaced teeth 82 which maybe compressed toward one another at the ends distal to ring 80 for insertion to the open end of a grip. Extending radially outwardly from each tooth 82 is a flange section 50. Once tool 36 is inserted into a grip, the free end of a club shaft may be introduced to the grip from muzzle end 21.

Figure 8:
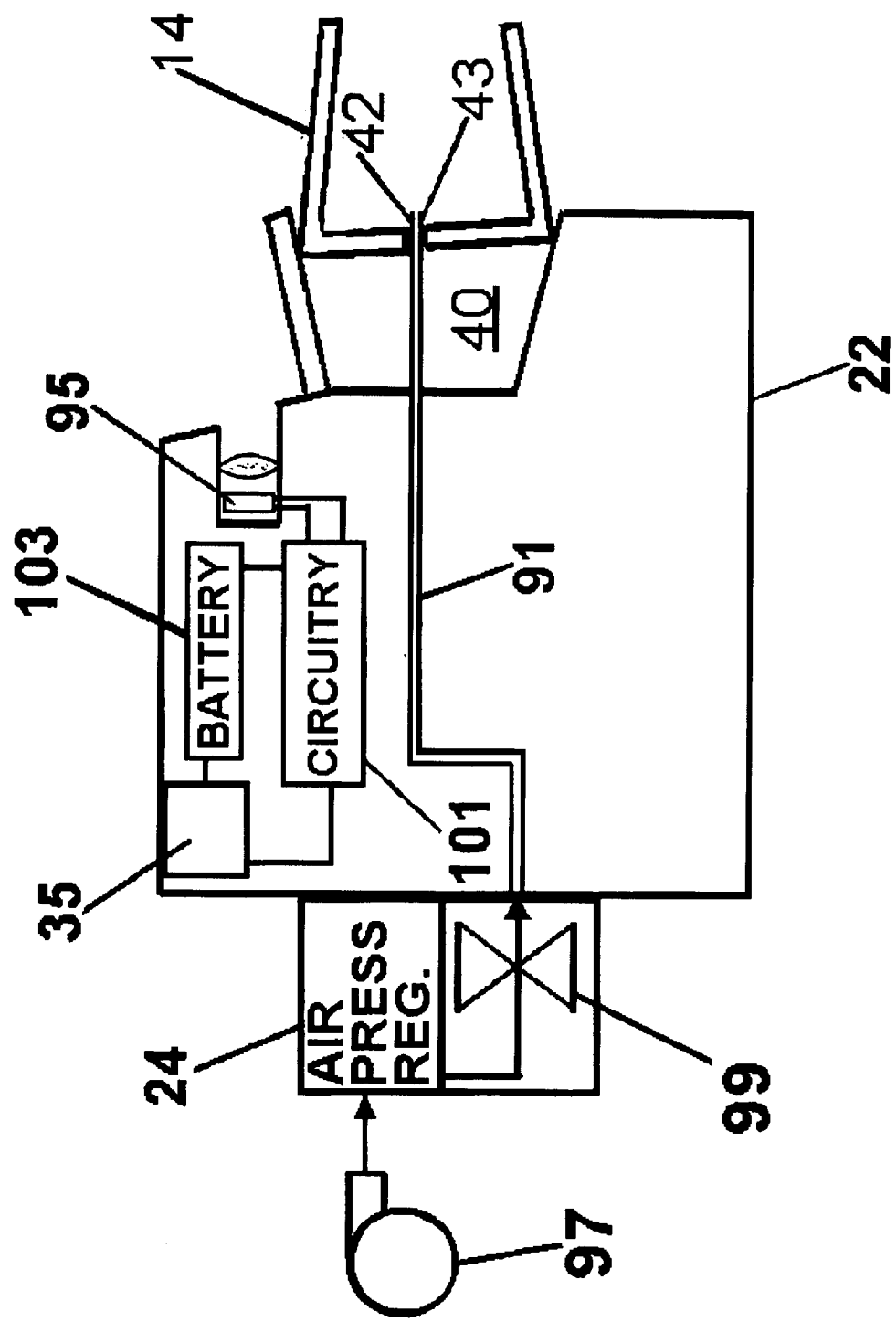
FIG. 8 is a schematic illustration of the tail stock section of the station.

FIG. 8 schematically illustrates tail stock end 22. Cup 40 receives a grip 14 along its closed end, guiding the grip into engagement with ventilation probe 42, which penetrates a small hole 43 in the top center section of the grip. Air passes into grip 14 from probe 42 from a compressor 97, which communicates with probe 42 by air pressure regulator 24, a foot-controlled valve 99, and a conduit 91 through tail stock section 22. Mounted above probe 42, but aligned on the axis thereof is a laser emitter 95 and beam shaping optics 96 which vertically spreads an emitted beam to project a line on a target. Laser emitter 95 and the beam shaping optics 96 provide means for aligning a club. The switch 35, battery 103 and drive circuitry 101 for laser emitter 95 are conventional.

The invention provides a mechanically simple handgrip fitting and aligning station usable on a work bench. The invention eases insertion of golf club shafts into handgrips for fitting and alignment.

While the invention is shown in only one of its forms, it is not thus limited but is susceptible to various changes and modifications without departing from the spirit and scope of the invention.

What is claimed is:

1. Apparatus for installing a grip on a shaft, the apparatus comprising:

a central cradle for receiving and supporting the grip along a central axis;

a tail stock section alignable along the central axis off of one end of the central cradle, the tail stock section including a cup for receiving the closed end of the grip and a probe for penetrating the closed end of the grip for passing air; and the tail stock section further comprising optical alignment means for projecting a line onto a target oriented down the central axis of the central cradle.

2. Apparatus as set forth in claim 1, further comprising:

a pressure regulator depending from the tail stock and communicating through a valve with the probe.

3. Apparatus as set forth in claim 2, the central cradle further comprising a muzzle end shaped to receive a grip stretching tool.

4. Apparatus as set forth in claim 3, the central cradle further comprising a base section having an elongated indentation aligned with the central axis and a lid which closes over the elongated indentation, an inner surface of the lid and the indentation forming, when the lid is closed, a substantially cylindrical plenum open at each of two ends for containing the grip, the lid further providing shaped subsection for capturing the grip stretching tool.

5. Apparatus as set forth in claim 4, the central cradle further comprising an extensible shaft support positionable from an end of the central cradle opposite to the end adjacent to the tail stock section.

6. Apparatus as set forth in claim 5, the central cradle further comprising a table edge abutment bracket extending downwardly from the base section.

7. An apparatus for radially expanding an elastic handgrip on its axis of elongation to allow easier introduction of a shaft to the elastic handgrip, the apparatus comprising:

a cylindrical grip end expansion tool;

a main body for supporting the shaft and fixing the position of the grip end expansion tool; and a tail stock section including a cup for receiving an end of the grip, a ventilation probe centered in the cup and aligned on a central axis thereof for penetrating a grip, and means for aligning the tail stock section and main body.

8. An apparatus as set forth in claim 7, wherein the means for aligning comprises a laser line generator located in the tail stock section directing a beam outwardly from the tail stock section in alignment with the ventilation probe.

9. An apparatus as set forth in claim 8, further comprising:

an air pump;

a pressure regulator connected to receive air from the air pump;

a valve connected to receive air from the pressure regulator and further connected to the tail stock section to deliver air through the tail stock section to the ventilation probe.

10. An apparatus as set forth in claim 9, the main body further comprising:

a central plenum defined by a recess in the main body and a lid attached to the main body, the central plenum being aligned along an axis;

an open end from the central plenum; and a retaining slot for the grip end expansion tool in the lid and the main body adjacent the open end from the central plenum.

* * * * *